United States Patent
Wada et al.

(10) Patent No.: US 6,950,285 B2
(45) Date of Patent: Sep. 27, 2005

(54) HEAD ARM ASSEMBLY WITH AN ARM MOTION LIMITING MEMBER AND DISK DRIVE DEVICE WITH THE HEAD ARM ASSEMBLY

(75) Inventors: Takeshi Wada, Tokyo (JP); Takashi Honda, Tokyo (JP); Kaoru Matsuoka, Osaka (JP); Hideki Kuwajima, Kyoto (JP)

(73) Assignees: TDK Corporation, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 147 days.

(21) Appl. No.: 10/463,517

(22) Filed: Jun. 18, 2003

(65) Prior Publication Data

US 2004/0001286 A1 Jan. 1, 2004

(30) Foreign Application Priority Data

Jun. 28, 2002 (JP) ........................................ 2002-189843

(51) Int. Cl.[7] ................................................ G11B 5/48
(52) U.S. Cl. .................................. 360/265.7; 360/265.9
(58) Field of Search ........................... 360/245.7, 265.1, 360/265.7, 265.9, 294.7

(56) References Cited

U.S. PATENT DOCUMENTS

| | | | |
|---|---|---|---|
| 6,172,853 B1 * | 1/2001 | Davis et al. ............. | 360/245.7 |
| 6,549,372 B1 * | 4/2003 | Chen et al. .............. | 360/234.5 |
| 6,667,856 B2 * | 12/2003 | Danielson et al. ....... | 360/244.8 |
| 6,714,386 B1 * | 3/2004 | Polycarpou et al. ..... | 360/265.1 |
| 6,751,064 B2 * | 6/2004 | Kuwajima et al. ....... | 360/244.8 |

OTHER PUBLICATIONS

U.S. Appl. No. 10/463,517, filed Jun. 18, 2003, Wada et al.
U.S. Appl. No. 10/626,603, filed Jul. 25, 2003, Honda et al.
U.S. Appl. No. 10/600,435, filed Jun. 23, 2003, Honda et al.

* cited by examiner

*Primary Examiner*—Jefferson Evans
(74) *Attorney, Agent, or Firm*—Oblon, Spivak, McClelland, Maier & Neustadt, P.C.

(57) ABSTRACT

A Head Arm Assembly includes a head slider having at least one head element, an arm member for supporting the head slider at one end section, an actuator, mounted to the other end section of the arm member for rotationally moving the arm member in a direction substantially parallel with a recording medium surface around a horizontal rotation axis of the arm member, a load generation unit for generating a load for energizing the head slider in a direction toward the recording medium surface by rotationally moving the arm member in a direction substantially orthogonal to the recording medium surface around a vertical rotation axis, and a limiter unit for restraining the arm member from rotationally moving more than a predetermined limit around the vertical rotation axis in a direction away from the recording medium surface.

24 Claims, 9 Drawing Sheets

HEAD ARM ASSEMBLY WITH AN ARM MOTION LIMITING MEMBER AND DISK DRIVE DEVICE WITH THE HEAD ARM ASSEMBLY

FIELD OF THE INVENTION

The present invention relates to a head arm assembly (HAA) having a recording and/or a reproducing head such as a flying type thin-film magnetic head or a flying type optical head, and to a disk drive device with the HAA.

DESCRIPTION OF THE RELATED ART

In a magnetic disk drive device, a magnetic head slider for writing magnetic information into and/or reading magnetic information from a magnetic disk is in general formed on a magnetic head slider flying in operation above a rotating magnetic disk. The slider is fixed at a top end section of an HAA.

The conventional HAA includes a support arm with high rigidity, a voice coil motor (VCM) that is an actuator to rotationally move this support arm in parallel with a magnetic disk surface, a suspension having elasticity, which is fixed to a tip end of the support arm, and a magnetic head slider mounted to a top end section of the suspension, and it is constructed so that a load applied to the magnetic head slider in a direction to the magnetic disc surface generated with a leaf spring provided at the suspension itself, or a leaf spring provided at a connecting section of the suspension and the support arm.

In the HAA with the conventional structure as described above, the magnetic head slider is mounted to the suspension at the tip of the leaf spring, and therefore when an impact is applied thereto from outside, there is a fear that the magnetic head slider is strongly vibrated and collided against the magnetic disk surface, and gives a damage to the disk surface.

In order to improve resistance of the HAA with the conventional structure against the impact, an HAA with a new structure, in which a main part of the HAA is constructed by an arm member with high rigidity, a magnetic head slider is mounted to one end section of the arm member while a VCM is mounted to the other end section, a support point to make it possible to rotationally move in a direction orthogonal to the surface of the magnetic disc is provided in the middle of the one end and the other end of the arm member, and a leaf spring for load generation is mounted to that section, is researched and developed (not known at the time of this application).

In the HAA with the conventional structure, a limiter mechanism for preventing the arm member from popping up when an impact is applied from outside is provided between a flexure and a load beam so that the flexure provided at the top end section of the suspension does not pop up from the load beam.

However, in the HAA with the aforementioned new structure, because the entire arm member is constructed by the member with high rigidity and moves together, it becomes impossible to provide the limiter mechanism with the above-described structure.

SUMMARY OF THE INVENTION

It is therefore an object of the present invention to provide a new structure HAA having an effective limiter mechanism, and a disk drive device including the HAA.

According to the present invention, an HAA includes a head slider having at least one head element, an arm member for supporting the head slider at one end section, an actuator, mounted to the other end section of the arm member, for rotationally moving the arm member in a direction substantially parallel with a recording medium surface around a horizontal rotation axis of the arm member, a load generation unit for generating a load for energizing the head slider in a direction to the recording medium surface by rotationally moving the arm member in a direction substantially orthogonal to the recording medium surface around a vertical rotation axis, and a limiter unit for restraining the arm member from rotationally moving more than a predetermined limit in a direction to separate from the recording medium surface around the vertical rotation axis. The horizontal and vertical axes of rotation are labeled based on the direction of motion about each axis.

Also, according to the present invention, a disk drive device includes at least one of the above-mentioned HAA.

The head slider and the actuator such as a VCM are mounted to the respective end sections of the arm member, and the horizontal rotation axis is located between them. The arm member is constructed to be able to rotationally move in the direction substantially orthogonal to the recording medium surface with the vertical rotation axis as the center, and the head slider is biased in the direction of the recording medium surface by the load generation unit. In the HAA with such a new structure, the limiter unit for the restraining the arm member from rotationally moving more than the predetermined limit in the direction to separate from the recording medium surface with the vertical rotation axis as the center is provided. By providing such limiter unit as restrains the arm member itself from rotationally moving more than the predetermined limit, the suspension can be prevented from popping up due to the impact applied from outside also in the HAA with the new structure.

It is preferred that the limiter unit is mounted to a horizontal bearing section located at a midpoint of the arm member to rotationally moving in a horizontal direction with the arm member.

It is also preferred that the limiter unit consists of a member having high rigidity, the member abutting to the arm member only when the arm member is rotationally moved by the predetermined limit.

It is further preferred that the limiter unit consists of a first member (damper section) that is always in contact with the arm member and has a spring property to deter a vibration of the arm member, and a second member (limiter section) that supports the first member and has high rigidity to arrest rotational movement of the arm member when the arm member is rotationally moved to the predetermined limit.

It is preferred that the limiter unit abuts to or is always in contact with the arm member at a position between the head slider and the vertical rotation axis.

It is preferred that the limiter unit abuts to or is always in contact with the arm member at a position between the actuator and the vertical rotation axis.

It is also preferred that the limiter unit includes a single arm or a plurality of arms that abut(s) to or are(is) always in contact with the arm member.

It is preferred that the horizontal rotation axis is provided at a horizontal bearing section located at a midpoint of the arm member, and that the vertical rotation axis consists of a protuberance provided in the vicinity of the horizontal bearing section.

It is further preferred that the load generation unit includes a leaf spring connected to the horizontal bearing section and the arm member.

It is preferred that the arm member includes a support arm having rigidity, and a flexure having elasticity, which is supported at one end section of the support arm and for controlling a flying attitude of the head slider, the head slider being fixed on the flexure.

It is also preferred that the arm member further includes a load beam having rigidity and including a load protrusion for applying load to the head slider, the flexure being fixed on the load beam.

Further objects and advantages of the present invention will be apparent from the following description of the preferred embodiments of the invention as illustrated in the accompanying drawings.

DESCRIPTION OF THE PREFERRED EMBODIMENTS

Figure 1:
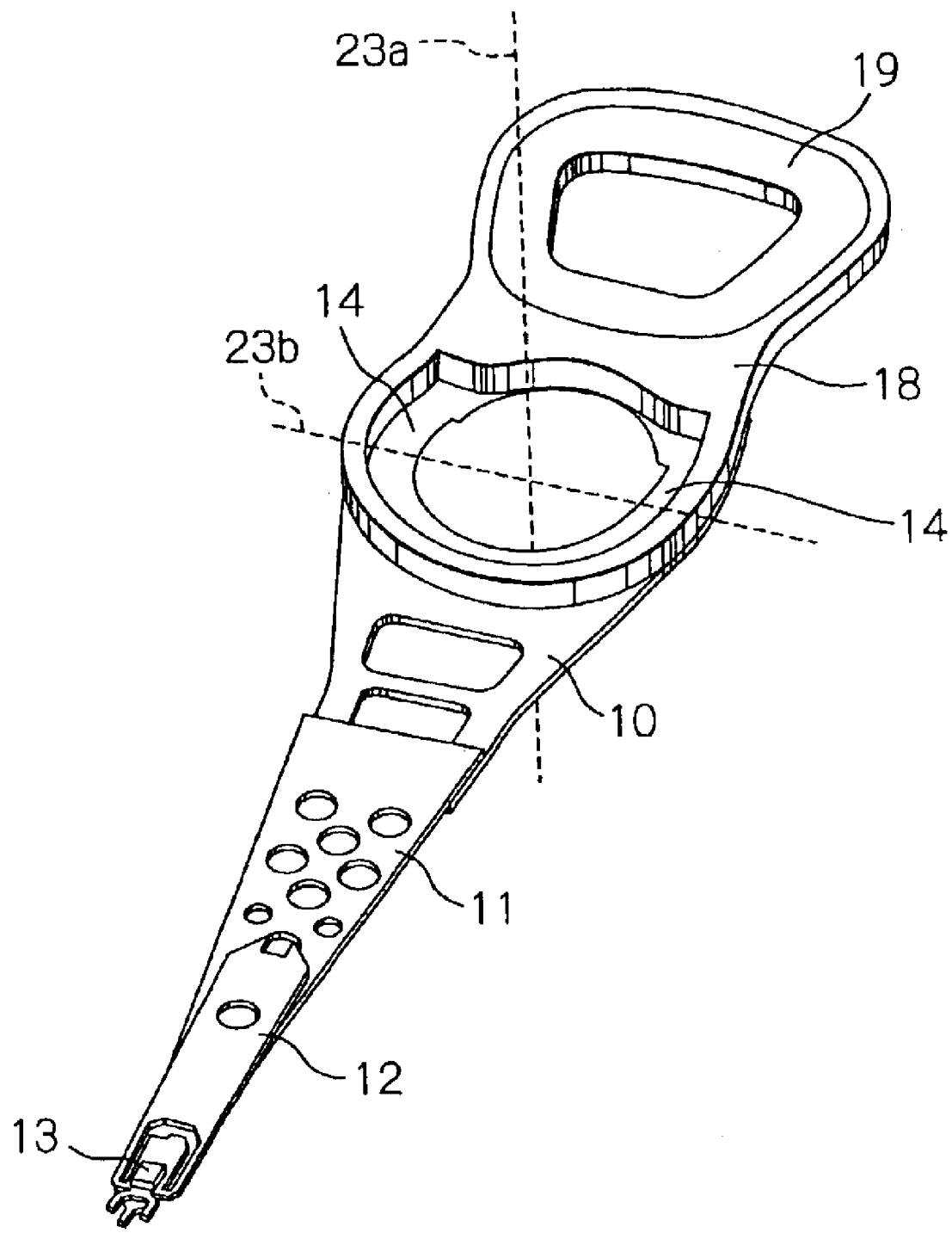
FIG. 1 is a perspective view schematically illustrating partial construction of an HAA in a preferred embodiment of the present invention.
Figure 2:
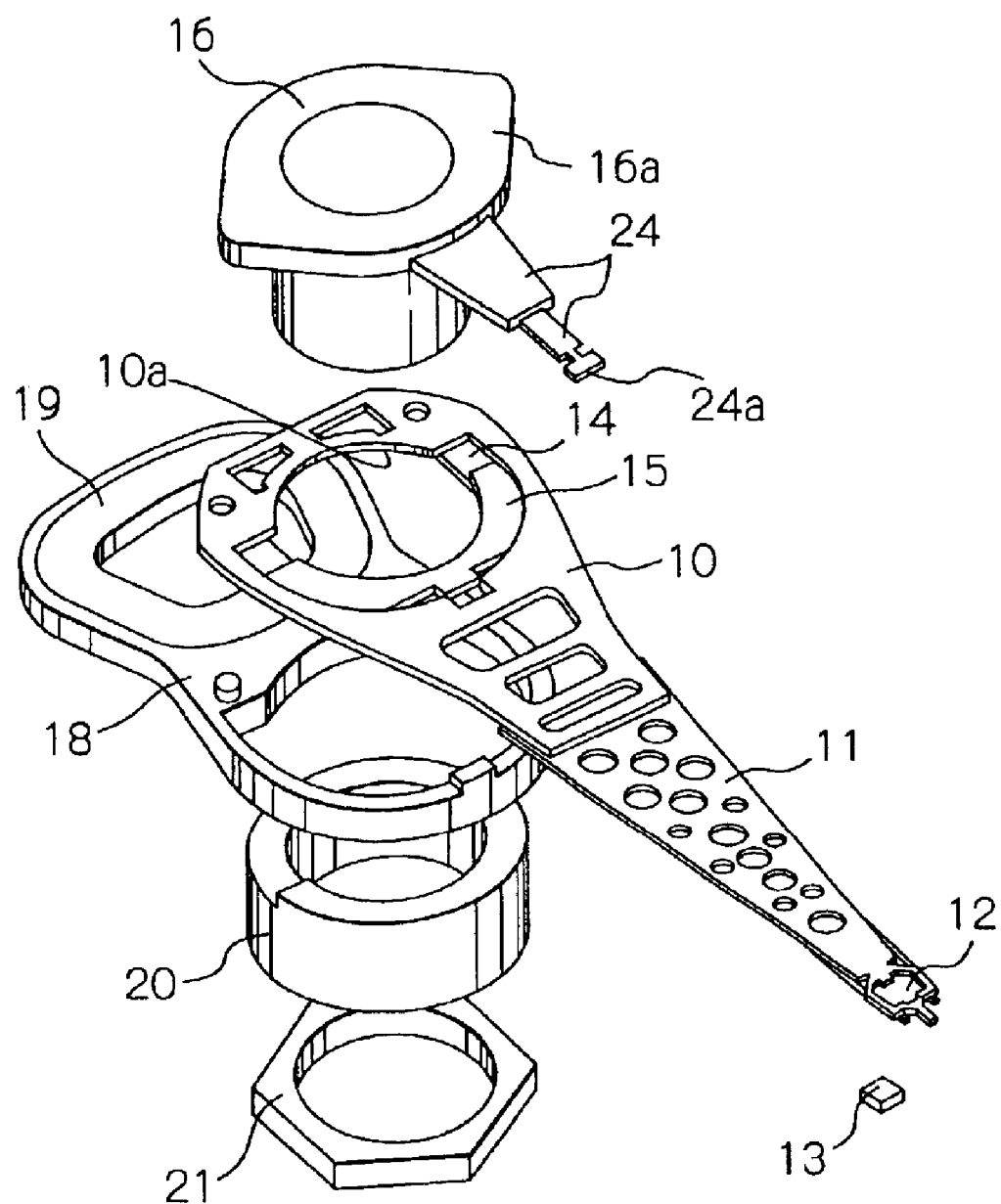
FIG. 2 is an exploded perspective view illustrating an entire construction of the HAA including the HAA in FIG. 1 and its mounting part.
Figure 3:
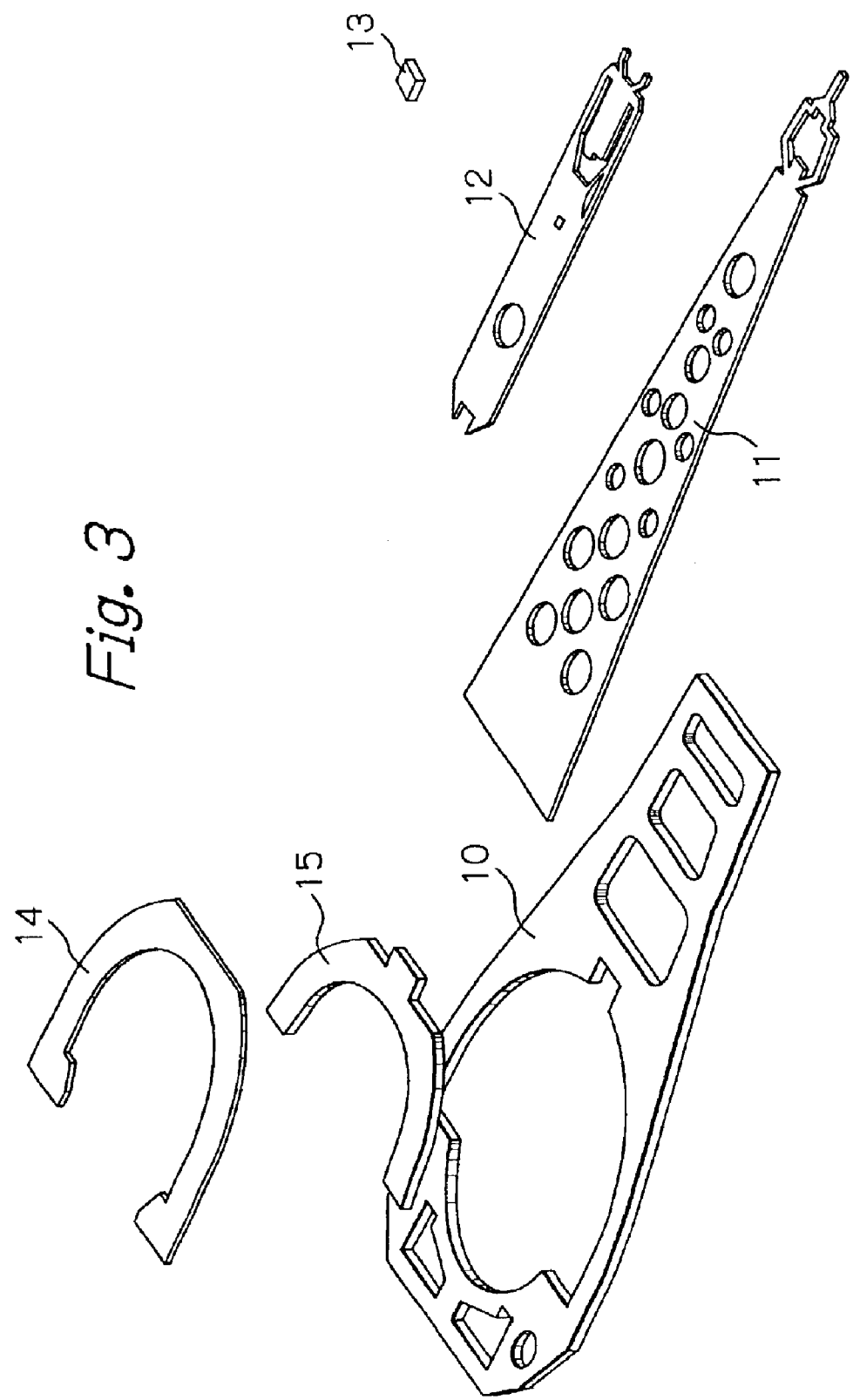
FIG. 3 is an exploded perspective view of the part of a head gimbal assembly (HGA) in FIG. 1.
Figure 4:
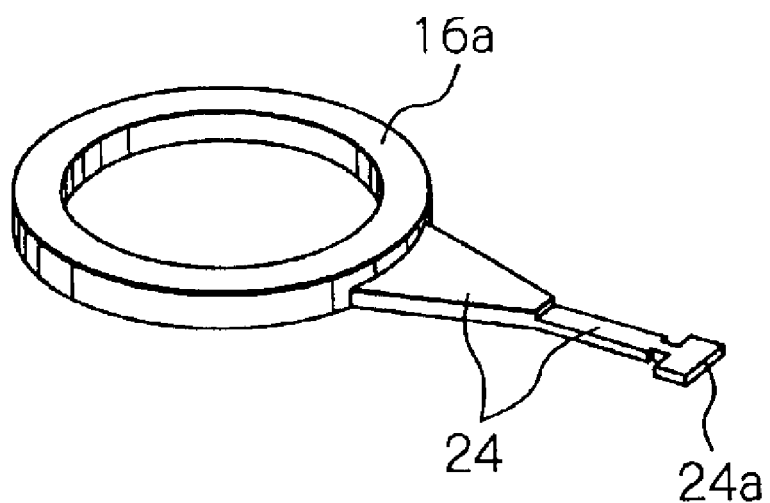
FIG. 4 is a perspective view illustrating a part of a limiter member in FIG. 1.
Figure 5:
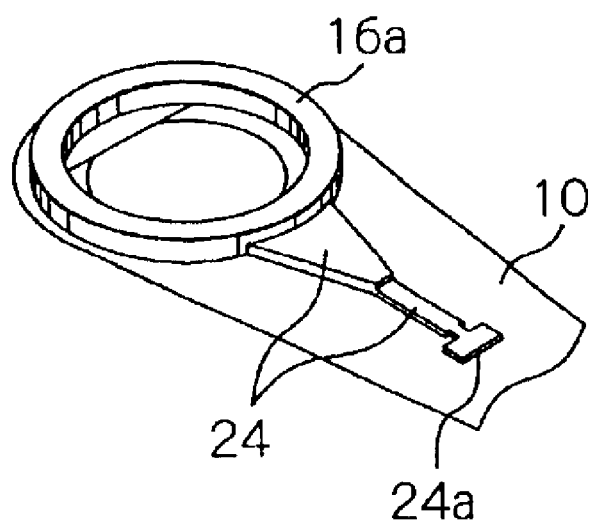
FIG. 5 is a perspective view illustrating part of the limiter member and a part of a support arm in FIG. 1.
Figure 6:
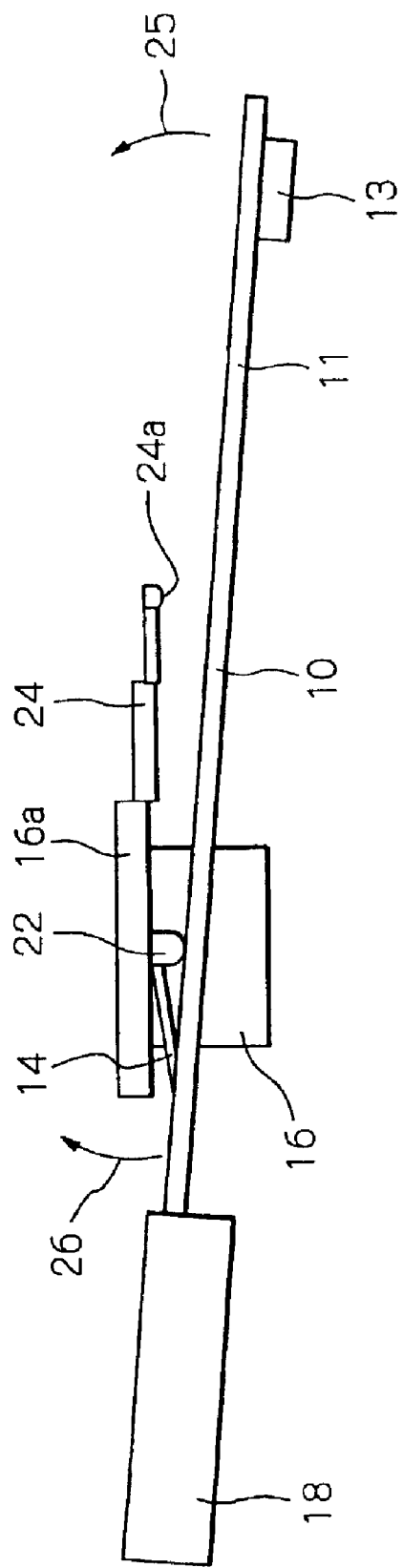
FIG. 6 is a side view schematically illustrating the entire construction of the HAA in FIG. 1.

FIG. 1 schematically illustrates a partial construction of an HAA in a preferred embodiment of the present invention, FIG. 2 illustrates an entire construction of the HAA including a mounting part thereof, FIG. 3 illustrates a part of an HGA thereof, FIG. 4 illustrates a part of a limiter member thereof, FIG. 5 illustrates the part of the limiter member thereof and a part of a support arm, and FIG. 6 schematically illustrates an entire construction of the HAA. It should be noted that FIGS. 1 and 3 are views of the HAA seen from below (a side facing a magnetic disk), and FIG. 2 is a view of the HAA seen from the opposite direction from that in FIGS. 1 and 3.

In these drawings, reference numeral 10 denotes a support arm having high rigidity, 11 denotes a load beam also having high rigidity with its base section being fixed to a top end section of the support arm 10, 12 denotes a flexure which is fixed to a top end section of the load beam 11 and has elasticity to control a flying attitude of a magnetic head slider 13, 13 denotes the magnetic head slider which is fitted to a tip end of the flexure 12 and includes at least one magnetic head element, 14 denotes a leaf spring for generating a load applied to the magnetic head slider 13, 15 denotes a fixing member for this leaf spring 14, 16 denotes a horizontal bearing part (bearing housing) for rotationally moving the support arm 10 in a direction parallel with the surface of a magnetic disk 17, 18 denotes a coil assembly which has a coil 19 for a VCM and is mounted to the support arm 10, 20 denotes a mounting spacer, and 21 denotes a nut, respectively.

The support arm 10 is constructed by a metal plate member having sufficient rigidity, for example, a stainless steel plate (for example, SUS304TA) about 330 μm thick, or a resin plate member.

The load beam 11 is constructed by a metal plate member having sufficient rigidity, for example, a stainless steel plate (for example, SUS304TA) about 40 μm thick. The load beam 11 and the support arm 10 are fixed by pinpoint fixation by a plurality of welded points with use of a laser beam or the like when the support arm 10 is a metal plate member.

The flexure 12 is constructed so as to give suitable stiffness to the magnetic head slider 13 pressed and loaded by a dimple (not shown) being a protuberance for applying a load provided at a top end section of the load beam 11. The flexure 12 is constructed by a stainless steel plate (for example, SUS304TA) about 25 μm thick in this embodiment. The flexure 12 and the load beam 11 are fixed by pinpoint fixation by a plurality of welded points with use of a laser beam or the like.

The leaf spring 14 is formed of a metal leaf spring material in substantially a circular shape or substantially a semicircular shape, and its thickness and quality are suitably selected so as to be able to give a desired load to the magnetic head slider 13. In this embodiment, the leaf spring 14 is constructed by a stainless steel plate (for example, SUS304TA) about 40 μm thick. The leaf spring 14 is placed to be coaxial with the fixing member 15, a mounting hole 10a of the support arm 10 and the bearing housing 16, both end sections of the semicircular shape are fixed to the support arm 10, and a central section is fixed to the bearing housing 16 via the fixing member 15. Accordingly, the support arm 10 is supported by the bearing housing 16 via the leaf spring 14. A rotation axis of the bearing housing 16 is a horizontal rotation axis 23a of the support arm 10, accordingly, the HAA, and the bearing housing 16 and the support arm 10 rotationally move together in the horizontal direction with this rotation axis 23a as the center.

The fixing member 15 is formed of a metal plate with high rigidity in substantially a semicircular shape, and in this embodiment, it is constructed by, for example, a stainless steel plate (for example, SUS304TA) about 100 μm thick.

A pair of protuberances, namely, pivots 22 as shown in FIG. 6 are provided on an under surface (surface on the side of the magnetic disk) of a flange portion 16a of the bearing housing 16. A pair of these pivots 22 are provided at such locations as they are axially symmetric with respect to a center axis of the support arm 10, and a straight line connecting both of them passes through an axial center of the bearing housing 16, and they are constructed so that tip ends of these pivots 22 abut to the support arm 10. Consequently, the support arm 10 is supported by the leaf spring 14 in the state in which it abuts to the tip ends of the pivots 22 and is axially supported, and the support arm 10 is biased in a direction orthogonal to the surface of the magnetic disk 17. In this case, the straight line connecting the tip ends of a pair of pivots 22 becomes a vertical rotation axis 23b of the support arm 10, accordingly, the HAA.

A limiter member 24 having only a limiter function is provided at a front surface (magnetic head slider side) of the flange portion 16a of the bearing housing 16, as shown in FIGS. 2, and 4–6. The limiter member 24 is formed by a member with high rigidity, and its tip end 24a is not in contact with the support arm 10 normally and is away from the support arm 10. When some impact is applied from outside, and the support arm 10 is rotationally moved at a certain angle (displacement height) in a direction (direction of the arrow 25 in FIG. 6) in which the magnetic head slider 13 separates form the magnetic disk with the vertical rotation axis 23b as a center, the tip end 24a of the limiter member 24 abuts to the surface of the support arm 10 or the load beam 11 to restrain the support arm 10 from rotationally moving more than this. Accordingly, the suspension can be prevented from popping up due to the impact applied from outside.

The limiter member 24 may be formed integrally with the bearing housing 16, or it may be fixed to the bearing housing 16 after it is formed separately. In the former case, there is no addition of a new component, which makes the production easy, and the production cost does not rise. In either case, the limiter member 24 is formed by a metal member or a plastic member so as to have high rigidity.

The load to the magnetic head slider 13 is applied by the leaf spring 14. Namely, the leaf spring 14 gives an elastic force in the direction shown by the arrow 26 to the support arm 10, whereby the force is transmitted by the support arm 10 having rigidity with the pivots 22 as the support points and the load beam 11, and biases the magnetic head slider 13 downward. According to this construction, the support arm 10 and the load beam 11 can be constructed by the members with high rigidity, and therefore resistance against the impact applied form outside can be enhanced. In addition, resonance frequency can be enhanced by using the arm with high rigidity, thus making it possible to perform positioning with high precision at a high speed without causing an unnecessary vibration mode.

The important point in this embodiment is that the limiter member 24 is provided at the front surface of the bearing housing 16, and this restrains the support arm 10 from rotationally moving upward at a certain angle or more. According to this, in the HAA with the structure for supporting the support arm 10 with high rigidity with the pivots 22 as the supporting points, the support arm can be prevented from popping up due to the impact applied from outside.

Figure 7:
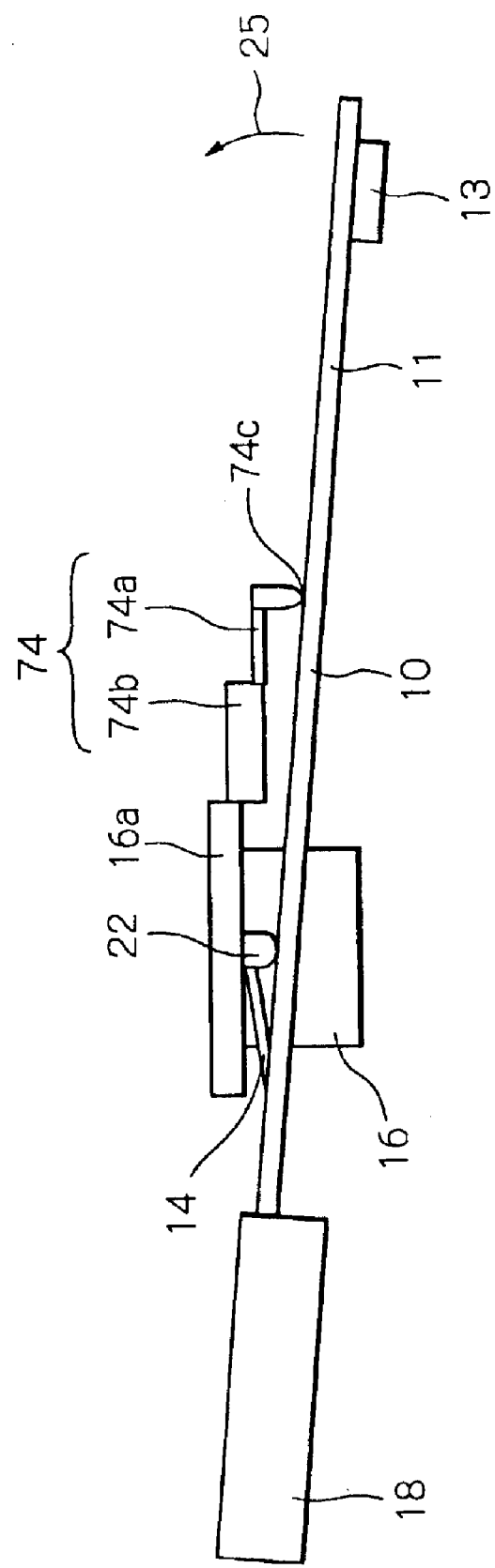
FIG. 7 is a side view schematically illustrating an entire construction of an HAA in another embodiment of the present invention.

FIG. 7 is a side view schematically illustrating an entire construction of an HAA in another embodiment of the present invention. In this embodiment, a damper/limiter member 74 having a damper function and a limiter function is provided at the front surface (the magnetic head slider side) of the flange portion 16a of the bearing housing 16. The damper/limiter member 74 has a two-stage construction of a damper part 74a having a spring property with low rigidity, and a limiter part 74b with high rigidity for supporting a base section of this damper part 74a, and a tip end 74c of the damper part 74a is constructed to be always in contact with the surface of the support arm 10 or the load beam 11.

When the support arm 10 is rotationally moved in a direction (the direction of the arrow 25 in FIG. 7) in which the magnetic head slider 13 separates from the magnetic disk with the vertical rotation axis 23b as a center for some reason, the vibration is attenuated by the vibration reduction effect of the damper part 74a of a low load and a low spring constant up to a certain angle (displacement height). When the impact is applied from outside and the support arm 10 is rotationally moved more than this, it exceeds the maximum displacement amount of the damper part 74a, and the rigidity of the limiter part 74b restrains the support arm 10 from rotationally moving more than this, whereby the suspension is prevented from popping up due to the impact applied form outside.

The damper/limiter member 74 may be formed integrally with the bearing housing 16, or may be fixed to the bearing housing 16 after it is formed separately. In the former case, the rigidities and spring constants are made different by changing the shapes and thicknesses of the damper part 74a and the limiter part 74b from each other. In this case, there is not addition of a new component, which facilitates the production, and the production cost does not rise. In the latter case, the damper part 74a and the limiter part 74b may be formed of the same material, or may be formed of the materials with different rigidities from each other. In either case, the damper part 74a is formed to have low rigidity, and the limiter part 74b has high rigidity.

The other constructions and the other operational effects of this embodiment are substantially the same as in the case of the embodiment in FIG. 1.

Figure 8:
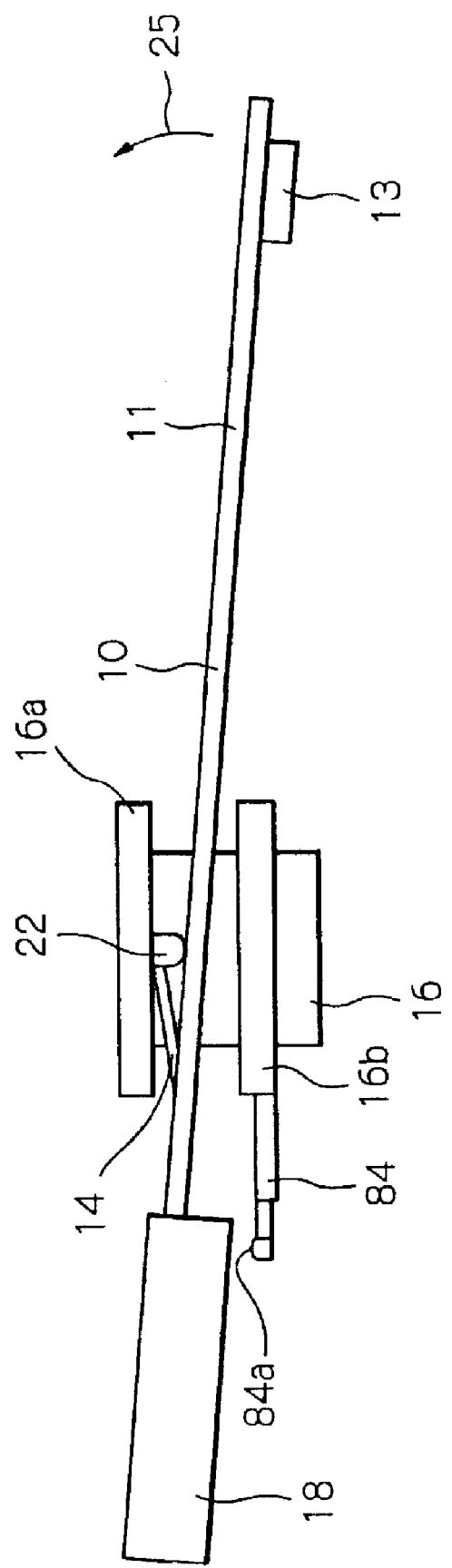
FIG. 8 is a side view schematically illustrating an entire construction of an HAA in still another embodiment of the present invention.

FIG. 8 schematically illustrates an entire construction of an HAA in still another embodiment of the present invention.

In this embodiment, a limiter member 84 having only the limiter function is provided at a rear surface (the VCM side) of a lower flange portion 16b of the bearing housing 16. The limiter member 84 is formed of a member with high rigidity, and its tip end 84a is not in contact with the coil assembly 18 or the support arm 10 normally, and is separated from them. When some impact is applied from outside, and the support arm 10 is rotationally moved at a certain angle (displacement height) in a direction in which the magnetic head slider 13 separates from the magnetic disk (the direction of the arrow 25 in FIG. 8) with the vertical rotation axis 23b as the center, a tip end 84a of the limiter member 84 abuts to a back surface of the coil assembly 18 or the support arm 10 to restrain the support arm 10 from rotationally moving more than this. Accordingly, the suspension can be prevented from popping up due to the impact applied from outside.

The limiter member 84 may be formed integrally with the bearing housing 16, or may be fixed to the bearing housing 16 after it is separately formed. In the former case, there is not addition of a new component, which facilitates the production, and the production cost does not rise. In either case, the limiter member 84 is formed by a metal member of a plastic member to have high rigidity.

The other constructions and the other operational effects of this embodiment are substantially the same as in the case of the embodiment in FIG. 1.

Figure 9:
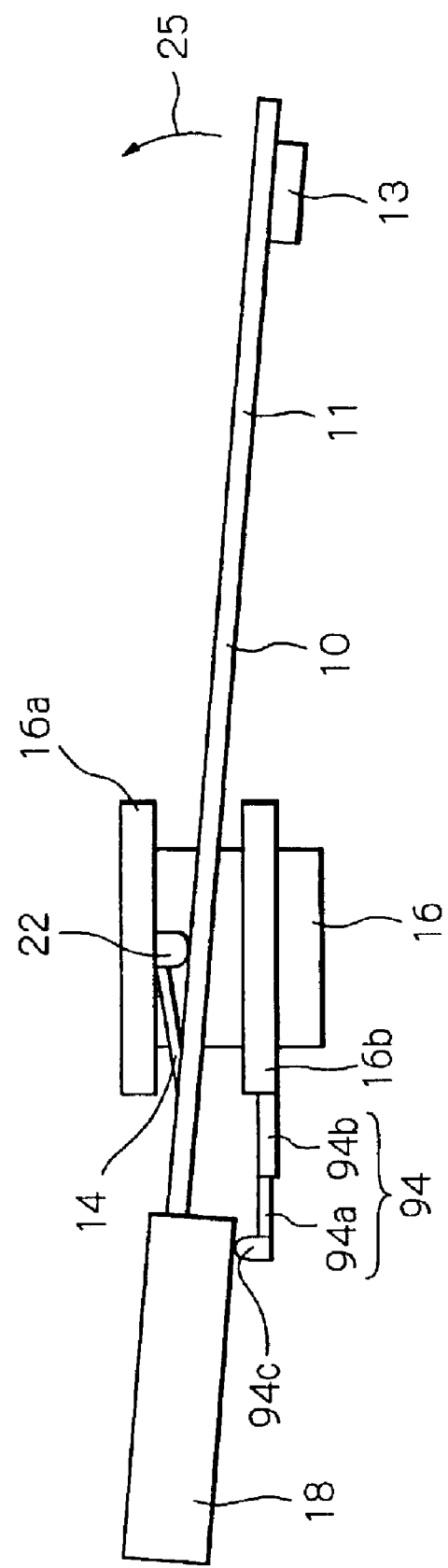
FIG. 9 is a side view schematically illustrating an entire construction of an HAA in yet another embodiment of the present invention.

FIG. 9 schematically illustrates an entire construction of an HAA in yet another embodiment of the present invention.

In this embodiment, a damper/limiter member 94 having the damper function and the limiter function is provided at a rear surface (the VCM side) of the lower flange portion 16b of the bearing housing 16. The damper/limiter member 94 has a two-stage construction of a damper part 94a having a spring property with low rigidity and a limiter part 94b with high rigidity for supporting a base section of this damper part 94a, and is constructed so that a tip end 94c of the damper part 94a is always in contact with a back surface of the coil assembly 18 or the support arm 10.

When the support arm 10 is rotationally moved in the direction in which the magnetic head slider 13 separates from the magnetic disk (the direction of the arrow 25 in FIG. 9) with the vertical rotation axis 23b as the center for some reason, the vibration is attenuated by a vibration reduction effect of the damper part 94a of a low load and a low spring constant to a certain angle (displacement height). When an impact is applied from outside, and the support arm 10 is rotationally moved more than this, it exceeds the maximum displacement amount of the damper part 94a, and the rigidity of the limiter part 94b restrains the support arm 10 from rotationally moving more than this, whereby the suspension is prevented from popping up due to the impact applied from outside.

The damper/limiter member 94 may be formed integrally with the bearing housing 16, or may be fixed to the bearing housing after it is formed separately. In the former case, the rigidities and spring constants are made different by changing the shapes and the thicknesses of the damper part 94a and the limiter part 94b from each other. In this case, there is not addition of a new component, which facilitates the production, and the production cost does not rise. In the latter case, the damper part 94a and the limiter part 94b may be formed of the same material, or may be formed with the materials with different rigidities. In either case, the damper part 94a is formed to have low rigidity, and the limiter part 94b is formed to have high rigidity.

The other constructions and the other operational effects of this embodiment are substantially the same as in the case of the embodiment in FIG. 1.

Figure 10:
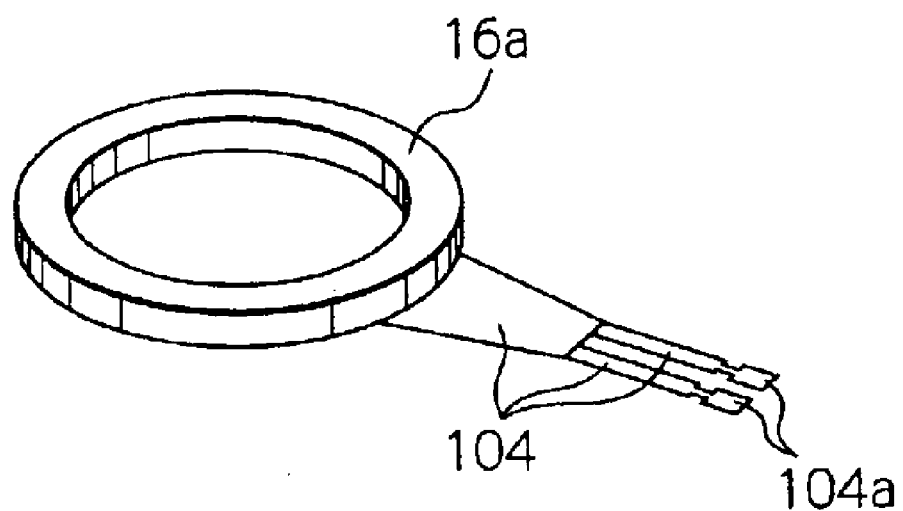
FIG. 10 is a perspective view illustrating a part of a limiter member in a modified mode of the aforementioned embodiment.
Figure 11:
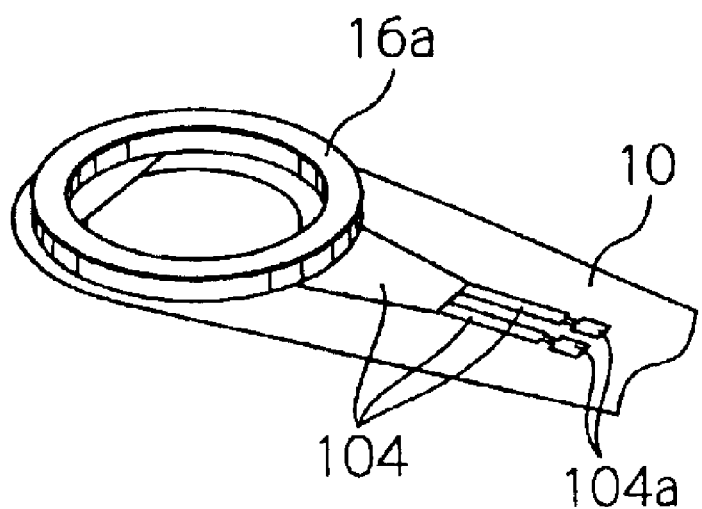
FIG. 11 is a perspective view illustrating the part of the limiter member and part of a support arm in FIG. 10.

FIG. 10 illustrates a limiter member section in a modified mode of the aforementioned embodiment, and FIG. 11 illustrates the limiter member section in FIG. 10 and part of the support arm.

In this modified mode, a limiter member 104 provided at the bearing housing 16 has two arms, and when an impact is applied to the support arm 10 from outside and the support arm 10 is rotationally moved more than a certain angle (displacement height), tip ends 104a of these two arms abut to the front surface of the support arm 10 or the load beam, or the back surface of the coil assembly 18 or the support arm 10 to restrict the rotational movement more than this, whereby the suspension is prevented from popping up due to the impact applied from outside.

The other constructions and the other operational effects of this embodiment are substantially the same as in the case of the embodiment in FIG. 1.

The shapes and constructions of the limiter member and the damper/limiter member in the embodiments described above and the modified mode are only examples, and it is obvious that any thing may be suitable if only the aforementioned function is satisfied. The member for mounting them is not limited to the bearing housing, and any member may be suitable if only it is the member rotationally moving in the horizontal direction together with the support arm.

The present invention is explained with use of the HAA including the thin-film magnetic head element, but the present invention is not limited only to the HAA like this, but it is obvious that the present invention is applicable to the HAA including the head element such as, for example, an optical head element other than a thin-film electromagnetic head element.

Many widely different embodiments of the present invention may be constructed without departing from the spirit and scope of the present invention. It should be under stood that the present invention is not limited to the specific embodiments described in the specification, except as defined in the appended claims.

What is claimed is:

1. A head arm assembly, comprising:
   a head slider having at least one head element;
   an arm member for supporting the head slider at one end section;
   an actuator, mounted to the other end section of the arm member, for rotationally moving the arm member in a direction substantially parallel with a recording medium surface around a horizontal rotation axis of the arm member;
   a load generation means for generating a load for energizing said head slider in a direction toward the recording medium surface by rotationally moving said arm member in a direction substantially orthogonal to said recording medium surface around a vertical rotation axis; and
   a limiter means for restraining said arm member from rotationally moving around said vertical rotation axis away from said recording medium surface more than a predetermined limit.

2. The head arm assembly as claimed in claim 1, wherein said limiter means is mounted to a horizontal bearing section located at a midpoint of said arm member to rotationally moving in a horizontal direction with said arm member.

3. The head arm assembly as claimed in claim 1, wherein said limiter means consists of a member having high rigidity, said member abutting to said arm member only when the arm member is rotationally moved by said predetermined limit.

4. The head arm assembly as claimed in claim 1, wherein said limiter means consists of a first member that is always in contact with said arm member and has a spring property to deter a vibration of the arm member, and a second member that supports the first member and has high rigidity to arrest rotational movement of the arm member when said arm member is rotationally moved to said predetermined limit.

5. The head arm assembly as claimed in claim 1, wherein said limiter means abuts to or is always in contact with said arm member at a position between said head slider and said vertical rotation axis.

6. The head arm assembly as claimed in claim 1, wherein said limiter means abuts to or is always in contact with said arm member at a position between said actuator and said vertical rotation axis.

7. The head arm assembly as claimed in claim 1, wherein said limiter means comprises a single arm that abuts to or is always in contact with said arm member.

8. The head arm assembly as claimed in claim 1, wherein said limiter means comprises a plurality of arms that abut to or are always in contact with said arm member.

9. The head arm assembly as claimed in claim 1, wherein said horizontal rotation axis is provided at a horizontal bearing section located at a midpoint of said arm member, and wherein said vertical rotation axis consists of a protuberance provided in the vicinity of the horizontal bearing section.

10. The head arm assembly as claimed in claim 9, wherein said load generation means comprises a leaf spring connected to said horizontal bearing section and said arm member.

11. The head arm assembly as claimed in claim 1, wherein said arm member comprises a support arm having rigidity, and a flexure having elasticity, which is supported at one end section of the support arm and for controlling a flying attitude of said head slider, said head slider being fixed on the flexure.

12. The head arm assembly as claimed in claim 11, wherein said arm member further comprises a load beam having rigidity and including a load protrusion for applying load to said head slider, said flexure being fixed on the load beam.

13. A disk drive device including at least one head arm assembly that comprises:
- a head slider having at least one head element;
- an arm member for supporting the head slider at one end section;
- an actuator, mounted to the other end section of the arm member, for rotationally moving the arm member in a direction substantially parallel with a recording medium surface around a horizontal rotation axis of the arm member;
- a load generation means for generating a load for energizing said head slider in a direction toward the recording medium surface by rotationally moving said arm member in a direction substantially orthogonal to said recording medium surface around a vertical rotation axis; and
- a limiter means for restraining said arm member from rotationally moving around said vertical rotation axis away from said recording medium surface more than a predetermined limit.

14. The disk drive device as claimed in claim 13, wherein said limiter means is mounted to a horizontal bearing section located at a midpoint of said arm member to rotationally moving in a horizontal direction with said arm member.

15. The disk drive device as claimed in claim 13, wherein said limiter means consists of a member having high rigidity, said member abutting to said arm member only when the arm member is rotationally moved by said predetermined limit.

16. The disk drive device as claimed in claim 13, wherein said limiter means consists of a first member that is always in contact with said arm member and has a spring property to deter a vibration of the arm member, and a second member that supports the first member and has high rigidity to arrest rotational movement of the arm member when said arm member is rotationally moved to said predetermined limit.

17. The disk drive device as claimed in claim 13, wherein said limiter means abuts to or is always in contact with said arm member at a position between said head slider and said vertical rotation axis.

18. The disk drive device as claimed in claim 13, wherein said limiter means abuts to or is always in contact with said arm member at a position between said actuator and said vertical rotation axis.

19. The disk drive device as claimed in claim 13, wherein said limiter means comprises a single arm that abuts to or is always in contact with said arm member.

20. The disk drive device as claimed in claim 13, wherein said limiter means comprises a plurality of arms that abut to or are always in contact with said arm member.

21. The disk drive device as claimed in claim 13, wherein said horizontal rotation axis is provided at a horizontal bearing section located at a midpoint of said arm member, and wherein said vertical rotation axis consists of a protuberance provided in the vicinity of the horizontal bearing section.

22. The disk drive device as claimed in claim 21, wherein said load generation means comprises a leaf spring connected to said horizontal bearing section and said arm member.

23. The disk drive device as claimed in claim 13, wherein said arm member comprises a support arm having rigidity, and a flexure having elasticity, which is supported at one end section of the support arm and for controlling a flying attitude of said head slider, said head slider being fixed on the flexure.

24. The disk drive device as claimed in claim 23, wherein said arm member further comprises a load beam having rigidity and including a load protrusion for applying load to said head slider, said flexure being fixed on the load beam.

* * * * *

UNITED STATES PATENT AND TRADEMARK OFFICE
CERTIFICATE OF CORRECTION

PATENT NO. : 6,950,285 B2  
DATED : September 27, 2005  
INVENTOR(S) : Wada et al.

It is certified that error appears in the above-identified patent and that said Letters Patent is hereby corrected as shown below:

<u>Title page,</u>  
Item [73], should read:  
-- [73] Assignees:   TDK Corporation, Tokyo (JP);  
                      Matsushita Electric Industrial Co., Ltd., Osaka (JP) --.

Signed and Sealed this

Twenty-third Day of May, 2006

JON W. DUDAS  
*Director of the United States Patent and Trademark Office*